(12) United States Patent
Kobayashi

(10) Patent No.: US 11,368,591 B2
(45) Date of Patent: Jun. 21, 2022

(54) IMAGE FORMING APPARATUS

(71) Applicant: KYOCERA Document Solutions Inc., Osaka (JP)

(72) Inventor: Yuya Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/216,750

(22) Filed: Mar. 30, 2021

(65) Prior Publication Data

US 2021/0314448 A1 Oct. 7, 2021

(30) Foreign Application Priority Data

Apr. 1, 2020 (JP) .............................. JP2020-066114

(51) Int. Cl.
*H04N 1/00* (2006.01)
(52) U.S. Cl.
CPC ...... *H04N 1/00037* (2013.01); *H04N 1/00602* (2013.01); *H04N 1/00604* (2013.01); *H04N 1/00663* (2013.01)
(58) Field of Classification Search
CPC .... B65H 2301/4212; B65H 2301/4213; B65H 2402/10; B65H 2402/32; B65H 2403/51; B65H 2404/1521; B65H 2405/11151; B65H 2405/324; B65H 2601/11; B65H 2801/27; B65H 31/02; B65H 31/22; B65H 31/24; G03G 15/607; G03G 15/6573; H04N 1/00554; H04N 1/121

USPC ......................................................... 358/498
See application file for complete search history.

(56) References Cited

U.S. PATENT DOCUMENTS

| 7,331,578 | B2 * | 2/2008 | Sano ...................... B65H 7/125 |
| | | | 271/262 |
| 8,827,268 | B2 * | 9/2014 | Morikawa ............ B65H 3/5284 |
| | | | 271/263 |
| 9,517,905 | B2 * | 12/2016 | Yoshimizu ............. B65H 5/068 |
| 9,670,017 | B2 * | 6/2017 | Anan ..................... H02P 29/032 |
| 9,735,714 | B2 * | 8/2017 | Yamagishi ............. G03G 15/50 |
| 2015/0360892 | A1 * | 12/2015 | Yoshimizu ............. B65H 5/062 |
| | | | 271/3.16 |
| 2017/0170754 | A1 * | 6/2017 | Yamagishi ............... B65H 5/06 |
| 2019/0152733 | A1 * | 5/2019 | Miyajima ................ B65H 7/00 |

FOREIGN PATENT DOCUMENTS

DE 102017129459 A1 * 6/2019 ............. B65G 43/00

* cited by examiner

*Primary Examiner* — Negussie Worku
(74) *Attorney, Agent, or Firm* — Studebaker & Brackett PC

(57) ABSTRACT

A drive motor drives conveyance rollers. A controller generates a control signal to control the drive motor based on information indicating a rotational speed of the drive motor. The controller generates an initial control signal to drive the conveyance rollers since before conveyance of a sheet by the conveyance rollers and acquires a characteristic value of the initial control signal as a reference value. While the conveyance rollers are conveying the sheet, the controller performs determination processing to determine whether or not to stop the drive motor driving the conveyance rollers based on the characteristic value of the control signal and the reference value.

6 Claims, 4 Drawing Sheets

IMAGE FORMING APPARATUS

INCORPORATION BY REFERENCE

The present application claims priority under 35 U.S.C. § 119 to Japanese Patent Application No. 2020-066114, filed on Apr. 1, 2020. The contents of this application are incorporated herein by reference in their entirety.

BACKGROUND

The present disclosure relates to an image forming apparatus.

In an image forming apparatus, sheets on which images are to be formed are picked up from a paper tray a sheet at a time by a pickup roller and conveyed along a sheet conveyance path. Multiple conveyance roller pairs are arranged on the sheet conveyance path which convey the sheets downstream in the sheet conveyance path. Note that the pickup roller and the conveyance rollers are driven by a motor.

Conveyance sensors are in multiple positions along the sheet conveyance path to confirm normal passage (normal conveyance) of the sheets. For example, an image forming apparatus is provided which includes a downstream jam detection means that detects a paper jam of the sheets during conveyance. The downstream jam detection means is an example of a conveyance sensor.

SUMMARY

An image forming apparatus according to an aspect of the present disclosure includes a plurality of conveyance rollers, a drive motor, and a controller. The conveyance rollers convey a sheet. The drive motor drives the conveyance rollers. The controller generates a control signal to control the drive motor based on information indicating a rotational speed of the drive motor. The controller generates an initial control signal as the control signal to drive the conveyance rollers since before conveyance of the sheet by the conveyance rollers, acquires a characteristic value of the initial control signal as a reference value, and, while the conveyance rollers are conveying the sheet, performs determination processing to determine whether or not to stop driving of the conveyance rollers based on the characteristic value of the control signal and the reference value.

DETAILED DESCRIPTION

Figure 1:
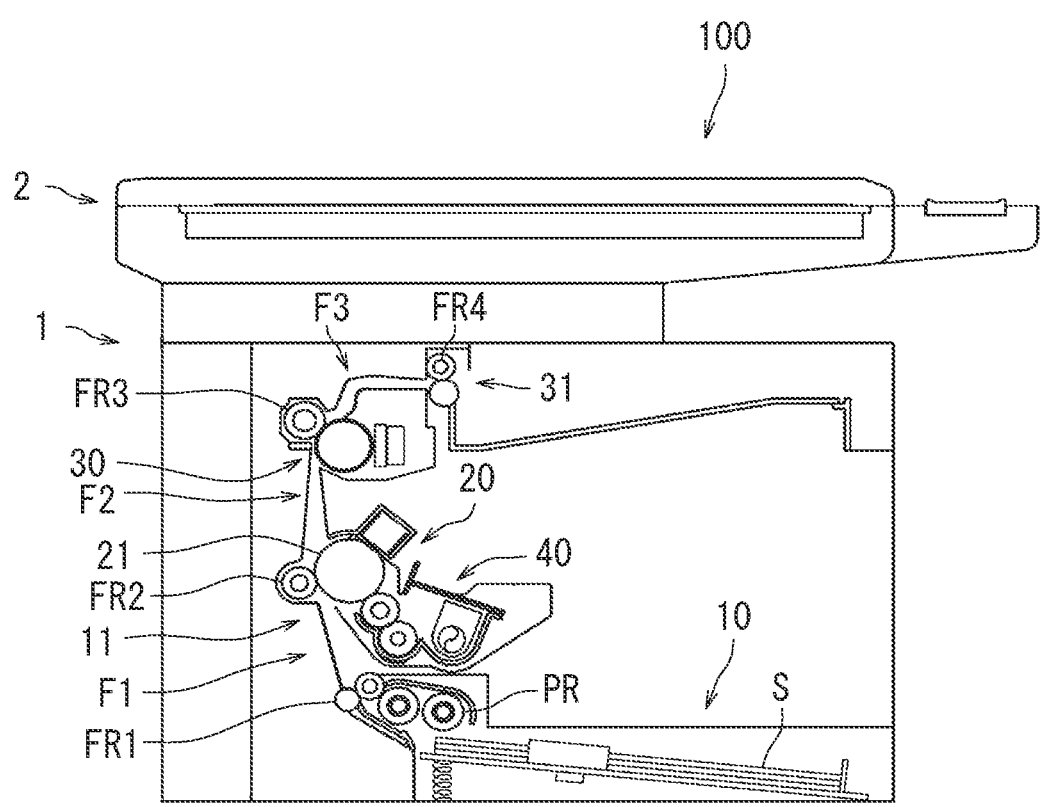
FIG. 1 is a diagram illustrating a configuration of an image forming apparatus according to an embodiment of the present disclosure.

The following describes an embodiment of the present disclosure with reference to the accompanying drawings. Note that elements that are the same or equivalent are labeled with the same reference signs in the drawings and description thereof is not repeated.

Figure 2:
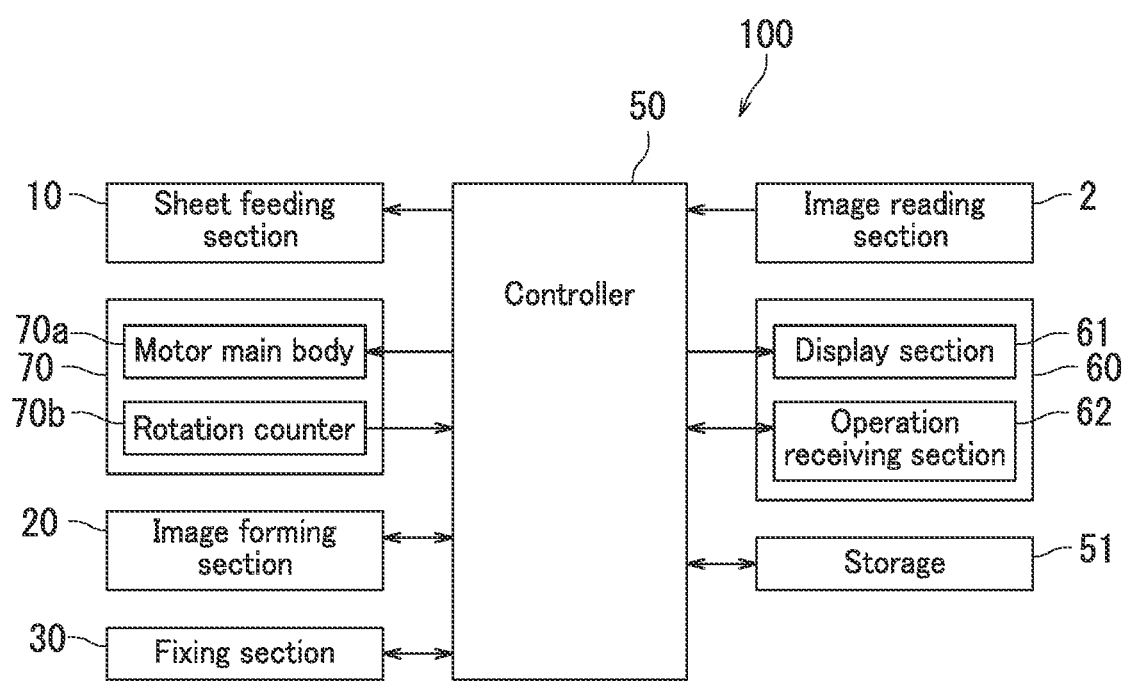
FIG. 2 is a block diagram illustrating the configuration of the image forming apparatus in the embodiment.

A configuration and operation of an image forming apparatus 100 in the present embodiment is described with reference to FIGS. 1 and 2. FIG. 1 is a diagram illustrating the configuration of the image forming apparatus 100 in the present embodiment. FIG. 2 is a block diagram illustrating the configuration of the image forming apparatus 100.

The image forming apparatus 100 is a copier or a multi-function peripheral, for example. The image forming apparatus 100 illustrated in FIG. 1 includes a main body 1 which forms and fixes an image to a sheet S, an image reading section 2, and an operation panel 60.

The image reading section 2 is an image reading device (scanner), for example. The image reading section 2 is connected to the main body 1. The operation panel 60 includes a display section 61 and an operation receiving section 62.

As illustrated in FIGS. 1 and 2, the main body 1 includes a sheet feeding section 10, a sheet conveyance section 11, an image forming section 20, a fixing section 30, an ejection section 31, a toner replenishing section 40, a drive motor 70 (FIG. 2), and a driving force transmission mechanism. The image forming apparatus 100 also includes a controller 50 and storage 51. Note that the drive motor 70 is omitted from FIG. 1. Furthermore, the driving force transmission mechanism is omitted from FIGS. 1 and 2.

The sheet feeding section 10 feeds a sheet S to the sheet conveyance section 11. The sheet feeding section 10 includes a lift-up paper tray and a pickup roller PR.

The paper tray carries a plurality of sheets S. The pickup roller PR picks up the sheets S from the paper tray a sheet at a time and conveys the sheets S to the sheet conveyance section 11. The paper tray is an example of a sheet tray.

The sheet conveyance section 11 conveys a sheet S fed from the sheet feeding section 10 to the ejection section 31 via the image forming section 20 and the fixing section 30. Specifically, the sheet conveyance section 11 includes a plurality of guide plates and a plurality of conveyance rollers FR. The guide plates and the conveyance rollers FR are arranged along the conveyance path of the sheet S.

In the following, the space between the sheet feeding section 10 and the image forming section 20 in the sheet conveyance path is referred to as a first conveyance path F1. Similarly, the space between the image forming section 20 and the fixing section 30 in the sheet conveyance path is referred to as a second conveyance path F2, and the space between the fixing section 30 and the ejection section 31 in the sheet conveyance path is referred to as a third conveyance path F3.

The conveyance rollers FR include a conveyance roller FR1 (here, a conveyance roller pair) arranged near the entrance to the first conveyance path F1. The sheet S picked up by the pickup roller PR is forwarded to the first conveyance path F1 by the conveyance roller FR1 and is conveyed in the conveyance path until reaching the image forming section 20.

The image forming section 20 forms an image on the sheet S. In the present embodiment, the image forming section 20 forms an image on the sheet S electrographically.

Specifically, the image forming section 20 includes a photosensitive drum 21 (image bearing member), a charger, a light exposure device, a development device, a transfer device, a cleaner, and a static elimination device.

The toner replenishing section 40 is arranged adjacent to the image forming section 20. The toner replenishing section 40 replenishes the development device of the image forming section 20 with toner, which is a consumable.

After image formation, the sheet conveyance section 11 conveys the sheet S to the fixing section 30. In detail, the conveyance rollers FR include a conveyance roller FR2 which forms a transfer nip together with the photosensitive drum 21. After image formation, the sheet S is forwarded to the second conveyance path F2 by the conveyance roller FR2 and is conveyed in the conveyance path until reaching the fixing section 30.

The fixing section 30 fixes the image to the sheet S. The fixing section 30 includes a pressure roller and a heating roller. The fixing section 30 applies heat and pressure to the sheet S to fix the image to the sheet S. In the present embodiment, the pressure roller and the heating roller constitute a conveyance roller FR3 (here, a roller pair).

After image fixation, the sheet conveyance section 11 conveys the sheet S to the ejection section 31. Specifically, the conveyance rollers FR include the conveyance roller FR3. After image fixation, the sheet S is forwarded to the third conveyance path F3 by the conveyance roller FR3 and is conveyed in the conveyance path until reaching the ejection section 31.

The ejection section 31 ejects the sheet S out of the main body 1. The ejection section 31 includes an ejection roller FR4. In the present embodiment, the conveyance rollers FR include the ejection roller FR4.

The drive motor 70 includes a motor main body 70a and a rotation counter 70b. The drive motor 70 supplies motive force (driving force) to each element in the main body 1. The drive motor 70 generates driving force which drives the photosensitive drum 21, the conveyance roller FR1, the conveyance roller FR2, the conveyance roller FR3, and the ejection roller FR4. The driving force generated by the drive motor 70 is transmitted to the driving force transmission mechanism (unillustrated).

The driving force transmission mechanism includes a plurality of gears and a plurality of shafts, for example. The driving force transmission mechanism distributes the driving force transmitted from the drive motor 70 to the conveyance rollers FR through the shafts and gears.

Specifically, the driving force transmitted from the driving force transmission mechanism is distributed to the pickup roller PR, the photosensitive drum 21, the conveyance rollers FR1, FR2, and FR3, and the ejection roller FR4 through the gears and shafts. The driving force distributed to the pickup roller PR, the photosensitive drum 21, the conveyance rollers FR1, FR2, and FR3, and the ejection roller FR4 causes each roller to rotate.

The rotation counter 70b of the drive motor 70 counts rotations of the motor main body 70a per unit of time (rpm). The rotation counter 70b is an encoder, for example. In the following, the number of rotations per unit of time may be referred to as a "rotation count".

The rotation counter 70b outputs a signal indicating a detected rotation count or a detected rotational speed to the controller 50. Using feedback control, the controller 50 adjusts the rotation count of the motor main body 70a based on the signal received from the rotation counter 70b.

Continuing, the image forming apparatus 100 is further described with reference to FIG. 2.

The controller 50 includes a processor such as a central processing unit (CPU). The controller 50 controls each element of the image forming apparatus 100 by executing a control program stored in the storage 51.

The controller 50 controls the rotation of the motor main body 70a based on the signal received from the rotation counter 70b. Specifically, based on the rotation count detected by the rotation counter 70b, the controller 50 generates a control signal to adjust the rotation count of the motor main body 70a (feedback control) such that the rotation count of the motor main body 70a approaches a target value.

In further detail, the controller 50 supplies a drive current pulse to the motor main body 70a as the control signal. The motor main body 70a rotates based on the drive current pulse. In the following, the drive current pulse may be referred to as a "motor drive current".

The controller 50 adjusts the rotation count of the motor main body 70a by controlling the duty cycle of the drive current pulse. In the following, the duty cycle is referred to as "duty".

The controller 50 monitors the duty of the motor drive current. In the following, the duty of the motor drive current may be referred to as "drive duty".

The controller 50 performs feedback control of the drive duty.

Furthermore, in the first stage of conveyance of the sheet S by the conveyance rollers FR, the controller 50 generates an initial control signal to drive the conveyance rollers FR. Thereafter, when the operation of the conveyance rollers FR is stabilized, the controller 50 stores the drive duty in the storage 51 as a reference value.

Specifically, when the drive duty stabilizes at an approximately constant level or fluctuation in the drive duty becomes small (±1%, for example) due to feed back control, the controller 50 stores the value of the drive duty in the storage 51 as the reference value.

Note that an "initial control signal" is a control signal sent by the controller 50 in the first stage of conveyance of the sheet S by the conveyance rollers FR. In other words, the initial control signal is sent before the pickup roller PR picks up the sheet S. The duty of the initial control signal may be referred to as an "initial drive duty".

Continuing, while the conveyance rollers FR are conveying the sheet S, the controller 50 performs determination processing to determine whether or not to stop the driving of the drive motor 70 and therefore stop the driving of the conveyance rollers FR based on a characteristic value of the control signal and the reference value. In other words, the controller 50 determines whether or not to stop the driving of the drive motor 70 and therefore stop the driving of the conveyance rollers FR after the conveyance of the sheet S has started.

Specifically, the controller 50 acquires an average value of the initial drive duty as the reference value. In detail, the controller 50 acquires the average value of the initial drive duty as the reference value after the operation of the conveyance rollers FR has stabilized.

The controller 50 then monitors the difference between the driving duty and the reference value and determines whether or not the difference exceeds a threshold during a period from when the pickup roller PR picks up the sheet S to when the ejection roller FR4 completes ejection of the sheet S. Note that the threshold is an arbitrary value and is stored in the storage 51. A "monitoring target value" obtained by adding the threshold to the reference value may also be used as a reference to determine whether or not the drive duty has exceeded the "monitoring target value".

When the difference between the drive duty and the reference value has exceeded the threshold while the conveyance rollers FR are conveying the sheet S, the controller 50 stops the drive motor 70. Furthermore, when the drive duty has exceeded the "monitoring target value" while the conveyance rollers FR are conveying the sheet S, the drive motor 70 is also stopped.

Note that when the pickup roller PR has picked up the sheet S, the controller 50 does not perform monitoring of the drive duty or determination processing during a prescribed period from when the sheet S was picked up.

This is processing to prevent additional load on the drive motor 70 due to driving the pickup roller PR from influencing the monitoring of the drive duty. Through the above, a period in which the drive duty readily increases immediately after the sheet S has been picked up can be omitted from time of monitoring. As a result, it is possible to prevent an increase in drive duty immediately after pickup from being mistakenly determined to be the occurrence of a paper jam.

Note that a prescribed period from the pickup of the sheet S in which the drive duty is not monitored may be referred to as an "exception period". The exception period is no longer than 1 second.

When the controller 50 stops the drive motor 70 according to a result of the determination processing to stop conveyance of the sheet S, the controller causes the display section 61 to display an error message. The error message is to notify of the possibility that a paper jam has occurred, for example.

When the drive duty has not exceeded the monitoring target value and performance of a print job has not been completed before ejection of the sheet S, the controller 50 causes the pickup roller PR to pick up the next sheet S.

The storage 51 includes a main storage device such as read-only memory (ROM) and random-access memory (RAM). The storage 51 may include an auxiliary storage device such as a hard disk drive (HDD). The storage 51 stores various computer programs and various data therein.

The storage 51 also stores therein a target value of the rotation count of the drive motor 70.

The display section 61 is a liquid-crystal display (LCD), for example. The display section 61 displays various screens.

In a case in which the display section 61 is a touch display, the display section 61 receives operation input from a user through the touch of a finger or the like. Note that the display section 61 is an example of a notification section in the present disclosure.

The operation receiving section 62 is hard keys, for example. The hard keys receive various operations from the user.

Figure 3:
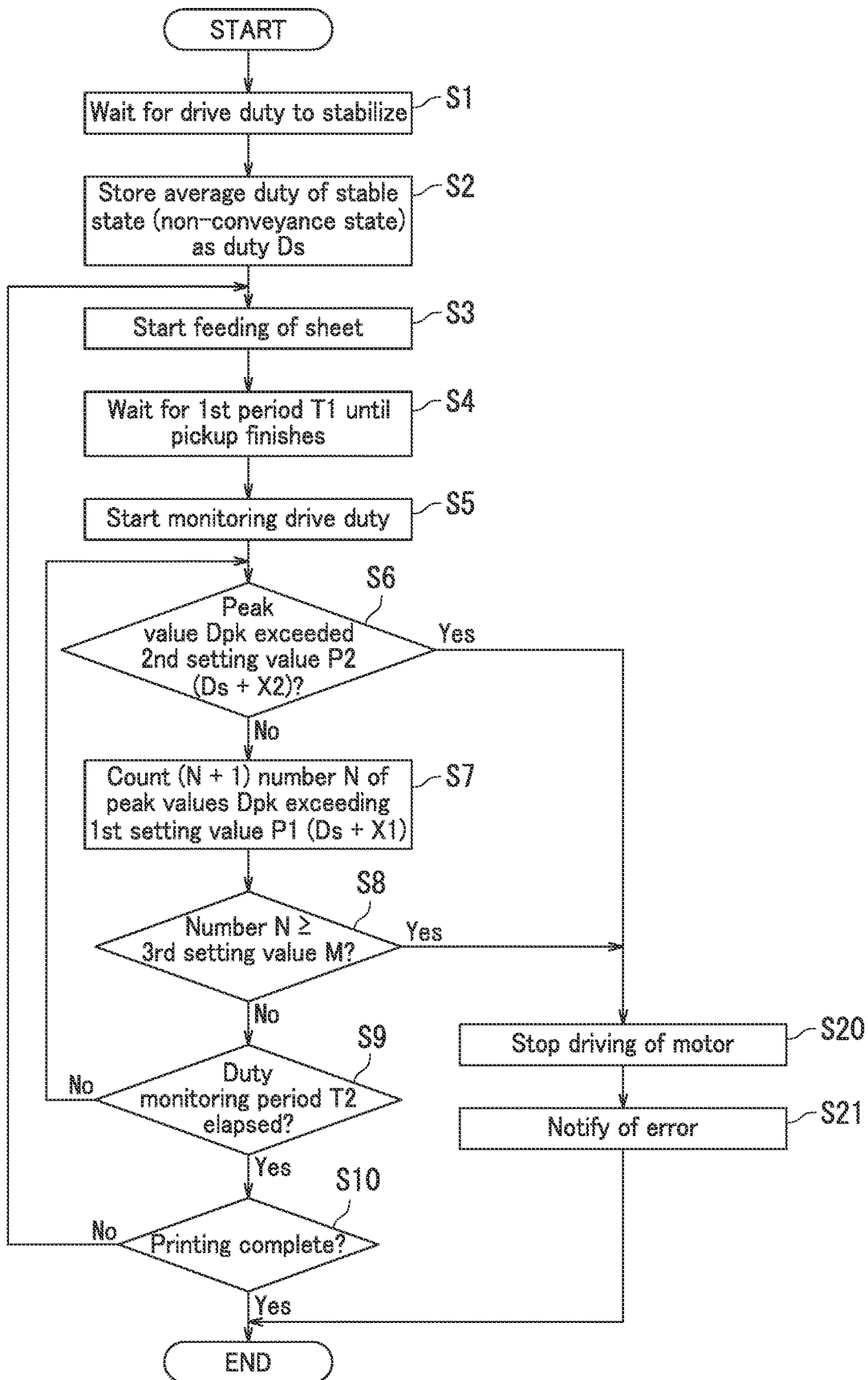
FIG. 3 is a flowchart depicting determination processing by which a paper jam during conveyance of sheets is detected in the image forming apparatus of the embodiment.
Figure 4:
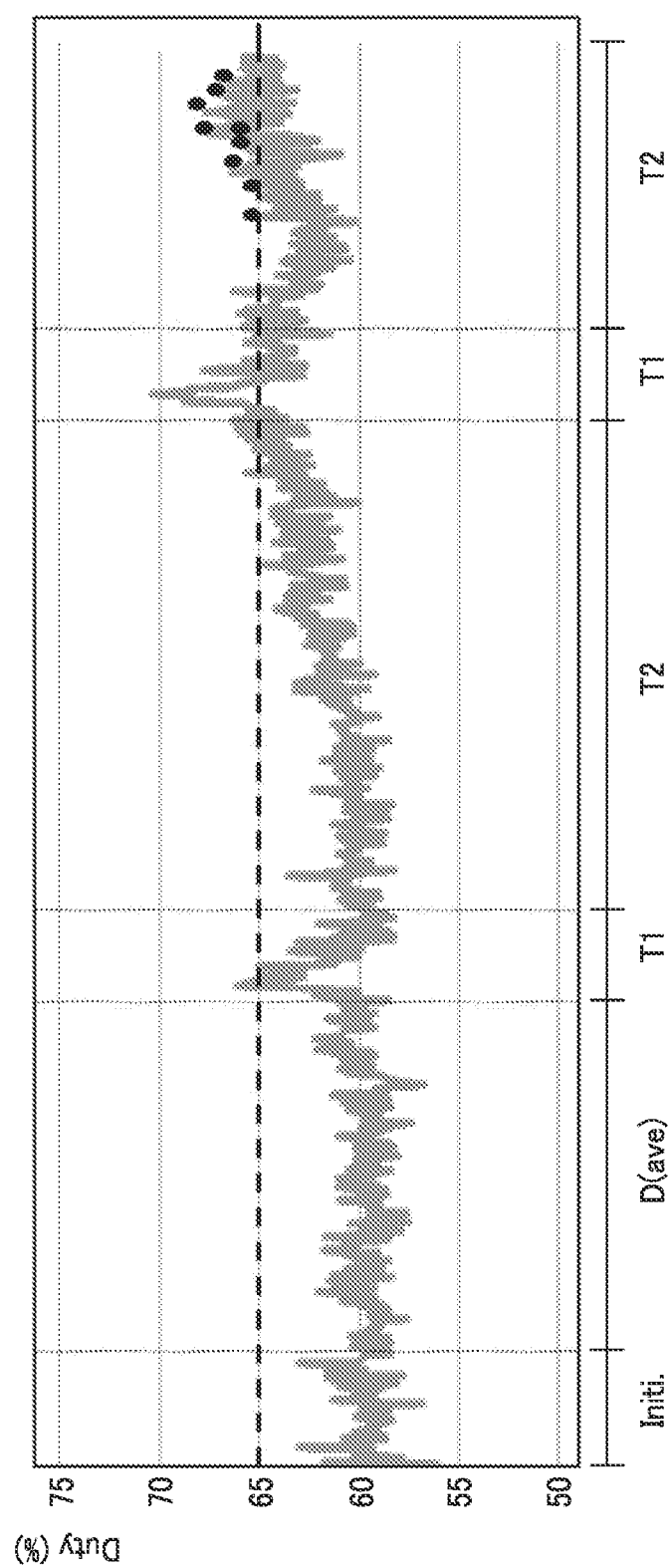
FIG. 4 is a graph illustrating a change in the duty of a drive motor during sheet conveyance in the image forming apparatus.

Next, the determination processing performed by the controller 50 is described with reference to FIGS. 3 and 4. FIG. 3 is a flowchart depicting the determination processing by which a paper jam is detected during conveyance of the sheets S. FIG. 4 is a graph illustrating a change in the drive duty of the drive motor 70 during sheet conveyance.

The determination processing illustrated in FIG. 3 starts when a printing instruction is given to the image forming apparatus 100. Specifically, the image forming apparatus 100 starts the determination processing when print job data has been received from the user.

As illustrated in FIG. 3, upon receiving print job data from the user, the controller 50 generates an initial control signal of a prescribed duty to start the driving of the conveyance rollers FR and waits for a prescribed period for the rotation of the conveyance rollers FR to stabilize in Step S1.

Specifically, the controller 50 sends an initial drive duty (here, 50%) to the drive motor 70 as the initial control signal. After sending the initial control signal, peak values Dpk of the pulse of the drive duty fluctuate as illustrated by the initial period (initi.) of the graph in FIG. 4.

In Step S1, the controller 50 controls the rotation count of the drive motor 70 which has started rotating using feedback control and waits for the rotation of the conveyance rollers FR to stabilize. Specifically, as illustrated by a stable period [D(ave)] in the graph of FIG. 4, the drive duty is stabilized by the feedback control of the controller 50 such that the peak values Dpk settle into a fluctuation range of about ±1%.

Upon confirming that the drive duty has stabilized, the controller 50 acquires the average duty (Ds %) of the stable state (non-conveyance state of a sheet S) and stores the average duty in the storage 51 as the reference value in Step S2.

Specifically, the reference value (average duty Ds) is stored as "59%" as shown in the graph of FIG. 4.

When the drive duty stabilizes, the controller 50 causes feeding of a sheet S in Step S3. In detail, a sheet S is picked up by the pickup roller PR and is conveyed to the first conveyance path F1 by the conveyance roller (pair) FR1.

At the same time as the feeding start of the sheet S, the controller 50 suspends the monitoring of the drive duty for a prescribed first period T1 in Step S4. This suspension is to not mistakenly recognize an increase in motor load (drive duty) caused by the operation of the pickup roller PR to be a jam.

Note that the period of "T1" indicated in FIG. 4 indicates an "exception period" in which the drive duty is not monitored after a sheet S is picked up. The first period T1 is no greater than one second. For example, the first period T1 may be about 0.1 seconds.

Upon conclusion of the exception period, the controller 50 resumes monitoring the drive duty in Step S5 and performs the determination processing of the drive duty in Steps S6 through S8.

When the determination processing is started, the controller 50 first determines whether or not the peak values Dpk of the drive duty exceed a second setting value P2 related to immediate stoppage of the drive motor 70 in Step S6.

The second setting value P2 is a value obtained by adding a second value X2 (%) to the stored reference value (average duty Ds). The second value X2 is stored in the storage 51. The second value X2 is set as a failsafe to protect the drive motor 70 when a serious malfunction occurs.

The serious malfunction is a state in which the drive motor 70 is locked and does not rotate at all due to an event such as the occurrence of a paper jam in multiple locations. Here, the second value X2 is 15%, for example. Accordingly, the second setting value P2 is the second value X2 (15%) added to the average duty Ds (59%) which totals as "74%".

When the drive duty has exceeded the second setting value P2 in Step S6, the controller 50 immediately stops the drive motor 70 in Step 20. Then, in Step S21, the processing concludes (ends) after notification of occurrence of an error.

When the drive duty is less than the second setting value P2 in Step S6, the controller 50 counts an abnormal value of the drive duty related to a paper jam.

In detail, after conclusion of the exception period, the controller 50 counts the number of times that a peak value Dpk of the drive duty exceeded a first setting value P1 during a predetermined duty monitoring period T2 in Step S7.

The first setting value P1 is a value obtained by adding a first value X1 (%) to the stored reference value (average duty Ds). The first value X1 is stored in the storage 51. The first value X1 is set within a range of 5 to 10%. In the present embodiment, the first value X1 is 5%, for example. Accordingly, the first setting value P1 is the first value X1 (5%) added to the average duty Ds (59%) which totals as "64%".

The duty monitoring period T2 is the period of "T2" indicated in FIG. 4. The duty monitoring period T2 corresponds to a period, after conclusion of the exception period, from when a sheet S enters the conveyance roller FR1 until the sheet S is ejected from the ejection section 31 after passing through the image forming section 20 and the fixing section 30. The controller 50 repeats Steps S6 through Step S9 in a loop during the duty monitoring period T2.

During the duty monitoring period T2, the controller 50 counts up (N+1) a stored number N each time a peak value Dpk of the drive duty exceeds the first setting value P1 in Step S7.

The controller 50 then confirms the number (count) of the detected peak values Dpk exceeding the first setting value P1 in Step S8. Specifically, the controller 50 determines for every loop of Steps S6 through S9 whether or not the number (number N) of peak values Dpk exceeding the first setting value P1 is equal to or greater than a third setting value M in Step S8.

The third setting value M is stored in the storage 51. The third setting value M is a value between 2 and 10 in the present embodiment. The third setting value M is "9", for example.

When the counted number N of peak values Dpk exceeding the first setting value P1 is equal to or greater than the third setting value M in Step S8, the controller 50 stops the drive motor 70 in Step S20. Then, in Step S21, the processing concludes (ends) after notification of an error.

To give a specific example, the number N of peak values Dpk exceeding the first setting value P1 in the first duty monitoring period T2 in the graph of FIG. 4 is less than 9, and the driving of the drive motor 70 and the printing are continued.

In the graph illustrated in FIG. 4, the number N of peak values Dpk exceeding the first setting value P1 in the second duty monitoring period T2 is equal to or greater than 9, so a determination of "Yes" is made in Step S8. As such, the controller 50 shifts to Step S20 and stops the driving of the drive motor 70.

By contrast, when the counted number N of peak values Dpk exceeding the first setting value P1 remains less than the third setting value M in Step S8, the controller 50 confirms that the duty monitoring period T2 has elapsed in Step S9 (Yes in Step S9), concludes the loop, and shifts to Step S10.

In Step S10, the controller 50 confirms completion of the print job. If the print job is complete in Step S10 (Yes in Step S10), the counter of the number N is reset and the determination processing is concluded (ended).

If the print job is incomplete in Step S10 (No in Step S10), the controller 50 starts feeding the next sheet S in Step S3 after resetting the counter of the number N, and continues printing. Note that in this case, the determination processing of whether or not a paper jam has occurred as above is continued for subsequent sheets S until the print job is completed.

In the image forming apparatus 100 of the above embodiment, a paper jam occurring at any position on the conveyance path of the sheets S can be detected without providing a conveyance sensor on the conveyance path of the sheet S. Furthermore, based on the detection, the drive motor 70 can be appropriately stopped before taking on an excessive load.

Accordingly, the drive motor 70 does not take on an excessive load, and as a result, the life span of the drive motor 70 can be increased.

An embodiment of the present disclosure is described above with reference to the accompanying drawings. However, the present disclosure is not limited to the above embodiment and may be implemented in various manners within a scope not departing from the gist thereof. For example, some constituent elements may be removed from the entirety thereof illustrated in the embodiment. The drawings mainly illustrate various constituent elements schematically to facilitate understanding. Aspects such as thickness, length, number, and interval of the constituent elements illustrated in the drawings may differ in practice for convenience of drawing preparation. Furthermore, aspects such as material, shape, and dimension of the constituent elements illustrated in the above embodiment are only examples and not particular limitations. The constituent elements may be variously altered within a scope not substantially departing from the configuration of the present disclosure.

What is claimed is:

1. An image forming apparatus comprising:
a plurality of conveyance rollers configured to convey a sheet;
a drive motor configured to drive the conveyance rollers; and
a controller configured to generate a control signal to control the drive motor based on information indicating a rotational speed of the drive motor, wherein
the controller
generates an initial control signal as the control signal to drive the conveyance rollers since before conveyance of the sheet by the conveyance rollers,
acquires a characteristic value of the initial control signal as a reference value, and
performs, while the conveyance rollers are conveying the sheet, determination processing to determine whether or not to stop driving of the conveyance rollers based on the characteristic value of the control signal and the reference value.

2. The image forming apparatus according to claim 1, further comprising
a sheet tray which carries the sheet, wherein
the conveyance roller include a pickup roller which picks up the sheet on the sheet tray, and
when the pickup roller has picked up the sheet, the controller does not perform the determination processing during a prescribed period from when the sheet was picked up.

3. The image forming apparatus according to claim 1, further comprising
a notification section configured to notify a user of information, wherein
when the driving of the conveyance rollers has been stopped, the controller causes the notification section to notify of an error message as the information.

4. The image forming apparatus according to claim 1, wherein
the characteristic value and the reference value each indicate a duty of a motor drive current.

5. The image forming apparatus according to claim 1, wherein
the controller determines whether or not a peak value of a duty of a motor drive current exceeds a first setting value, the controller counts the number of times that the peak value of the duty of the motor drive current exceeds the first setting value, when determining that the number of times that the peak value of the duty of the motor drive current exceeds the first setting value is equal to or greater than a setting value, the controller determines to stop the driving of the conveyance rollers, and the first setting value is a value obtained by adding a first value to the reference value.

6. The image forming apparatus according to claim 5, wherein the controller determines whether or not the peak value of the duty of the motor drive current exceeds a second setting value, when determining that the peak value of the duty of the motor drive current exceeds the second setting value, the controller determines to stop the driving of the conveyance rollers, the second setting value is a value obtained by adding a second value to the reference value, and the second value is greater than the first value.

* * * * *